July 11, 1933.  W. B. MOIR  1,917,314
RAILING FOR WELLHOLE CARS
Filed Jan. 3, 1933   6 Sheets-Sheet 1
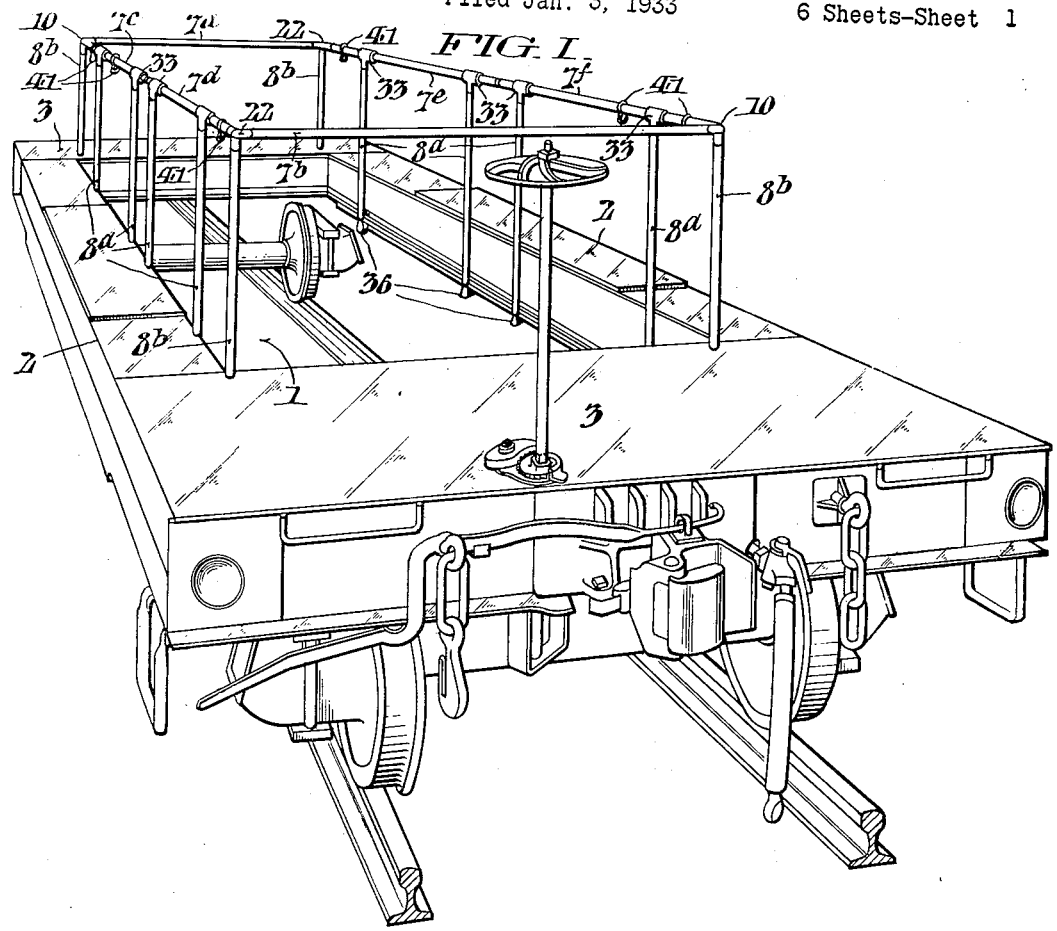
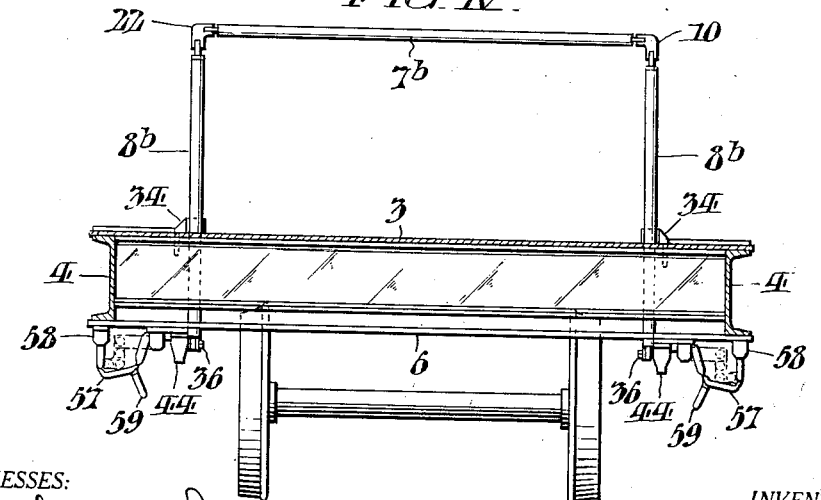
WITNESSES:
INVENTOR:
William B. Moir,
BY
ATTORNEYS.

July 11, 1933.  W. B. MOIR  1,917,314
RAILING FOR WELLHOLE CARS
Filed Jan. 3, 1933   6 Sheets-Sheet 2
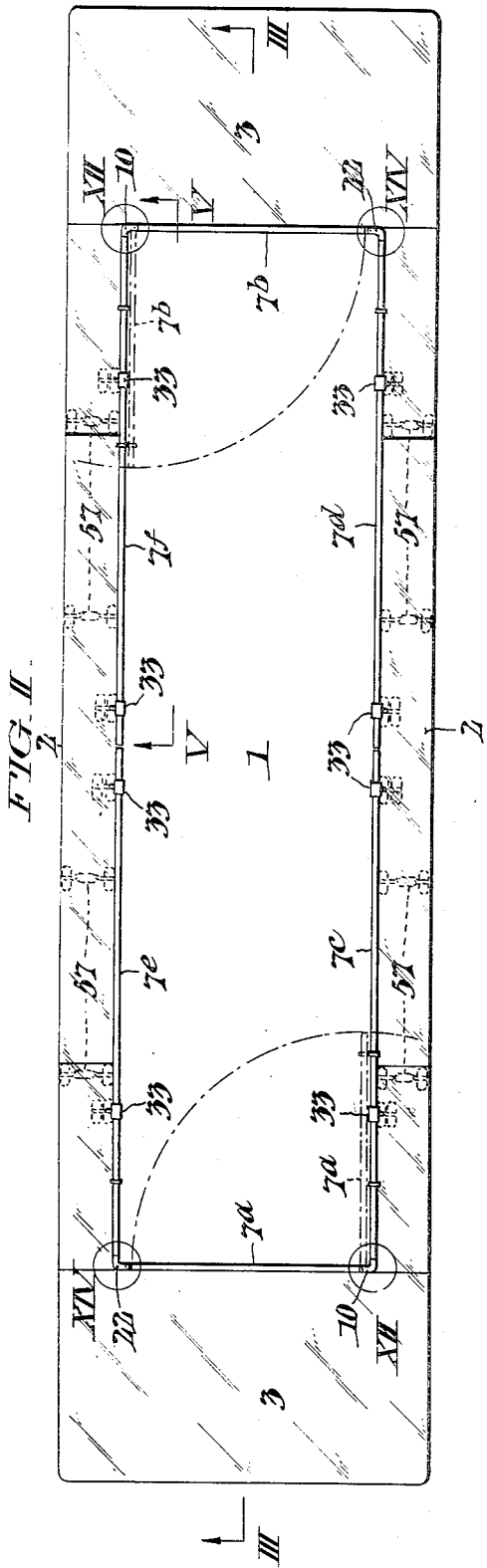
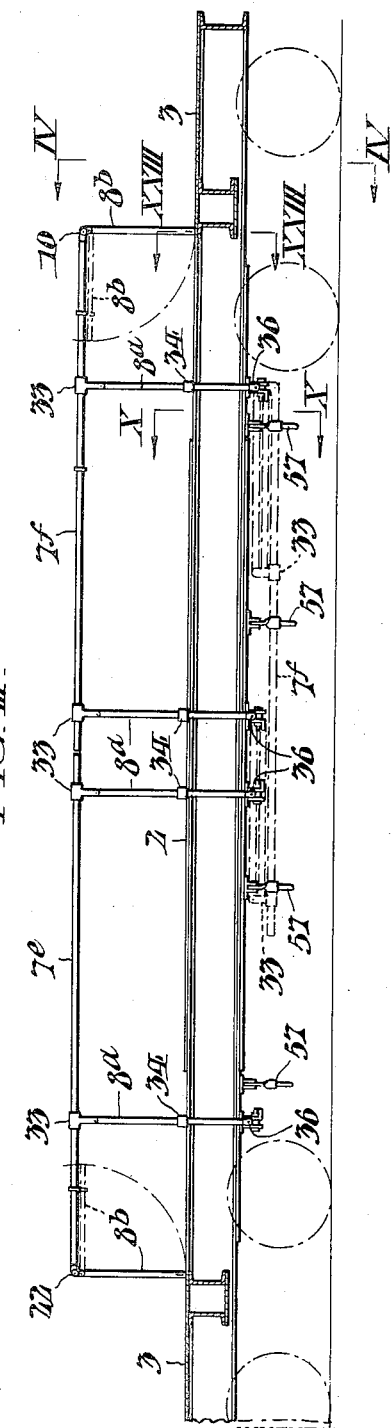
INVENTOR:
William B. Moir,
BY
ATTORNEYS.

July 11, 1933.  W. B. MOIR  1,917,314
RAILING FOR WELLHOLE CARS
Filed Jan. 3, 1933  6 Sheets-Sheet 3
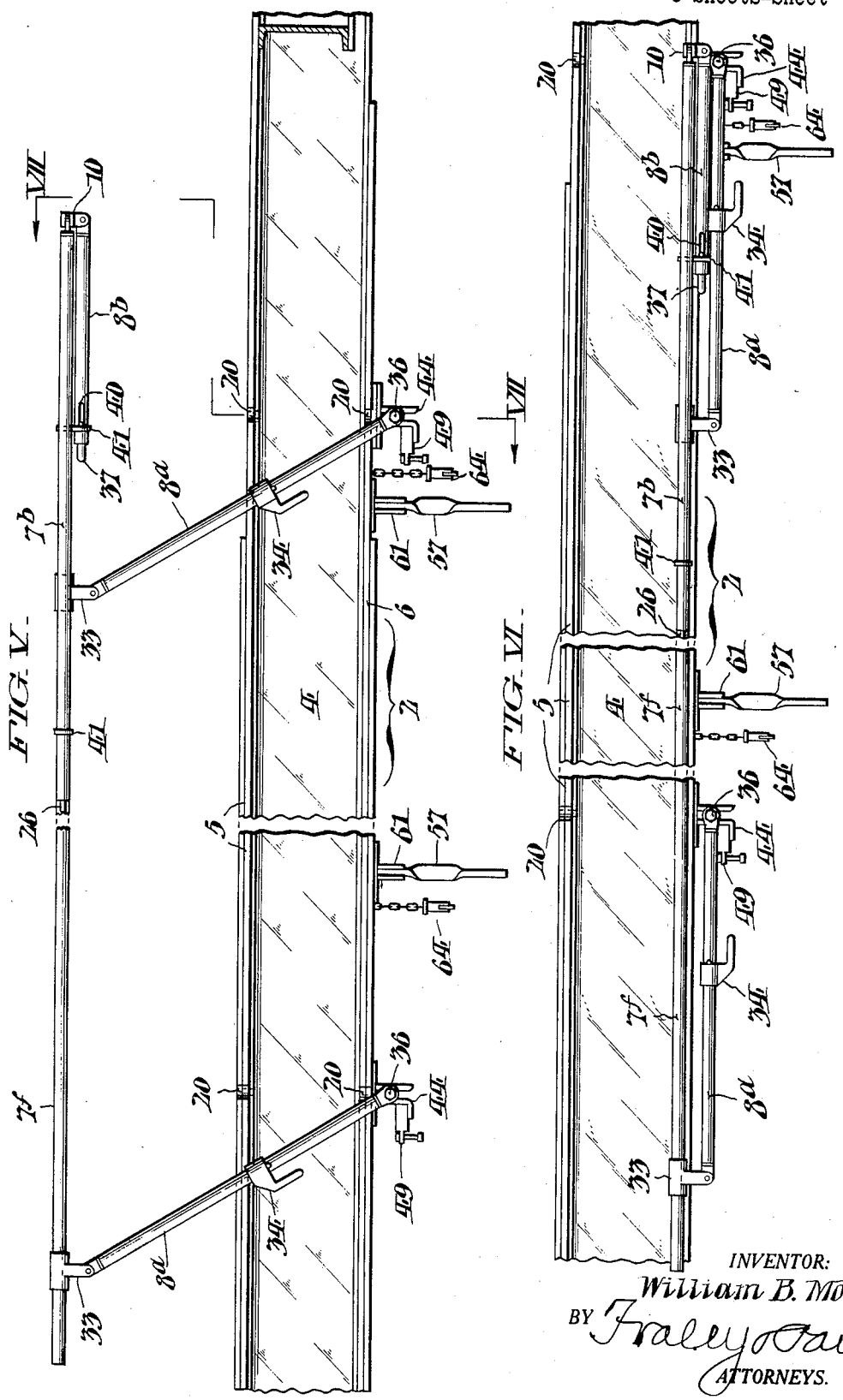
INVENTOR:
William B. Moir,
BY
ATTORNEYS.

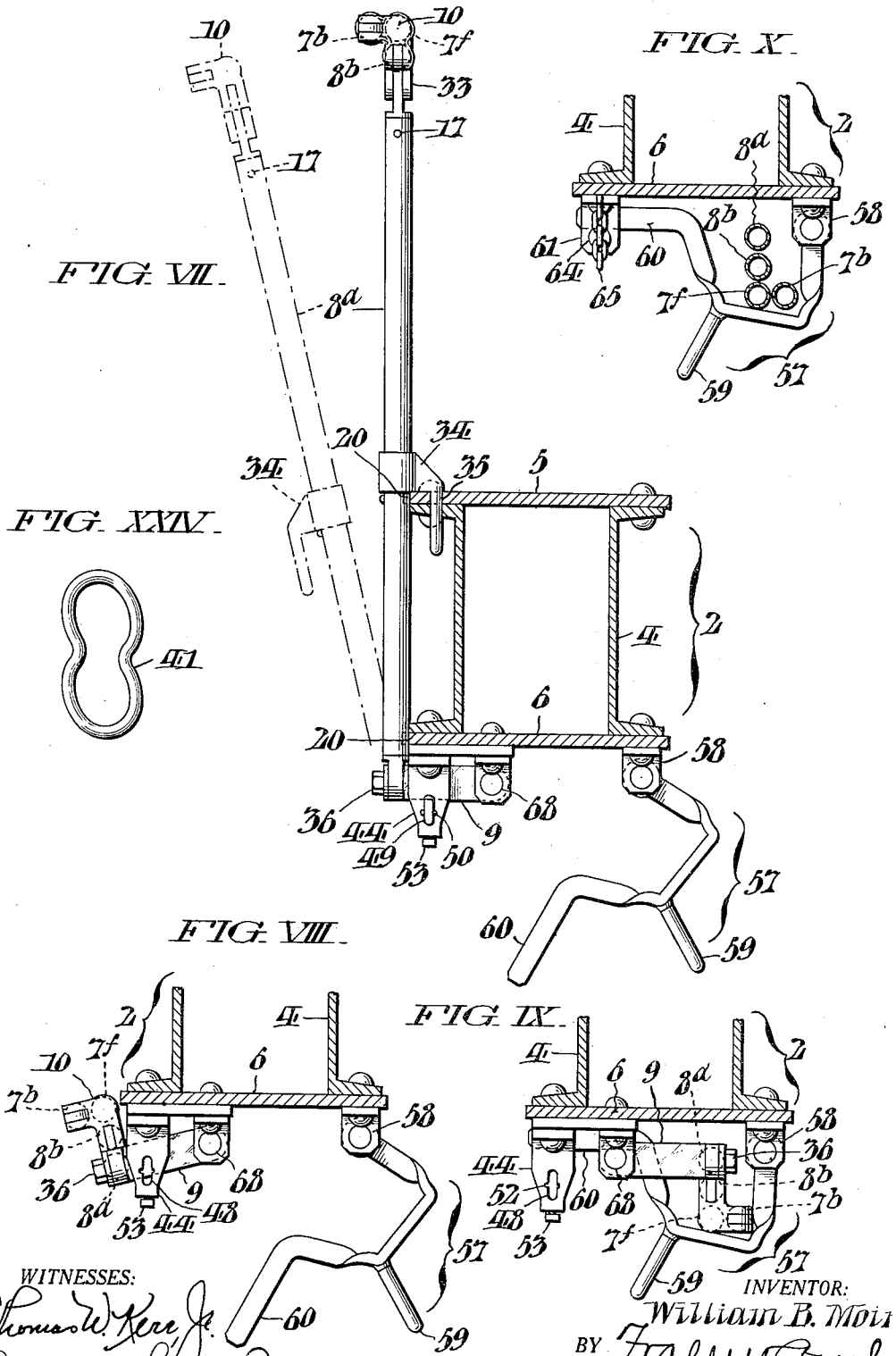

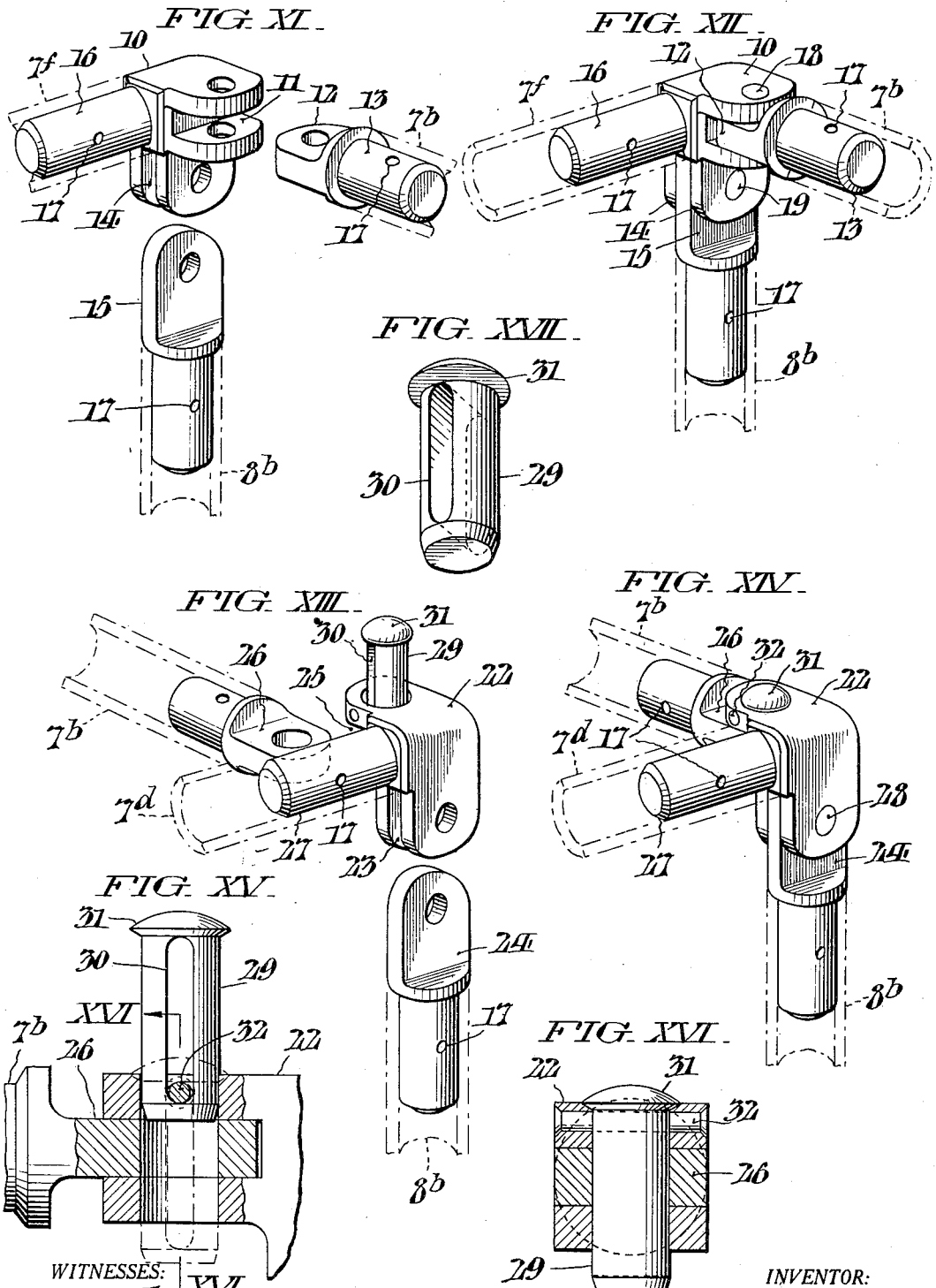

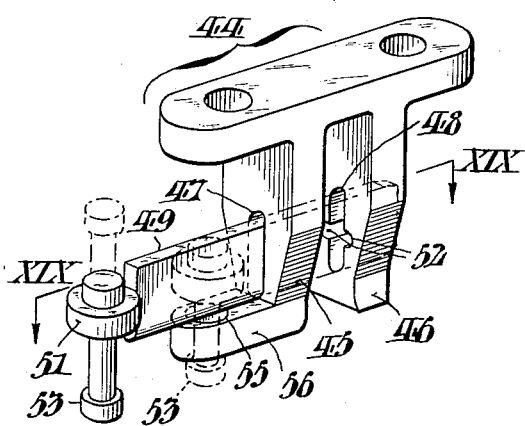
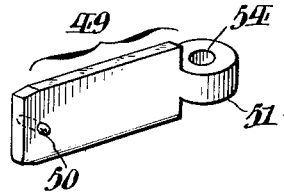
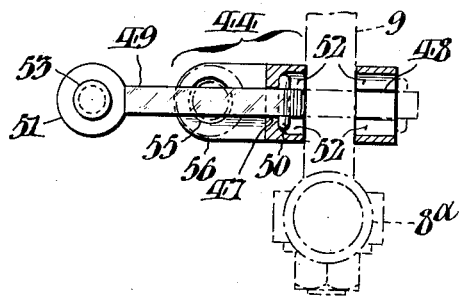
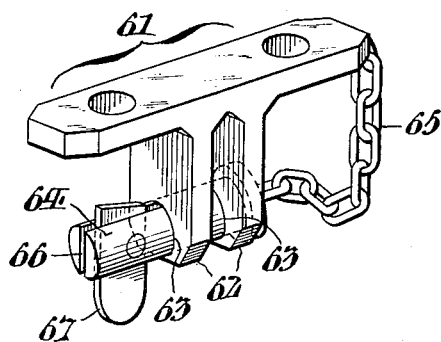
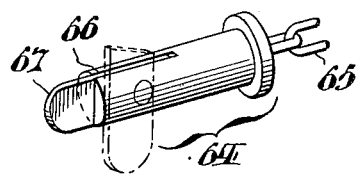
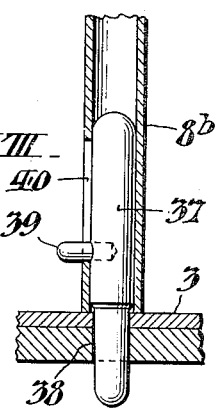

Patented July 11, 1933

1,917,314

UNITED STATES PATENT OFFICE

WILLIAM B. MOIR, OF PITTSBURGH, PENNSYLVANIA

RAILING FOR WELLHOLE CARS

Application filed January 3, 1933. Serial No. 649,908.

This invention relates to railings for wellhole cars. Such cars are commonly used to carry large castings, i. e., mill housings, ingot moulds, fly wheels, which, if carried on an ordinary flat car, would exceed overhead clearance limits. When a car of this character is empty and forms a part of a moving train, it is extremely perilous for trainmen to attempt to pass over the car platform unless a hand railing is placed around the well-hole.

Heretofore it has been proposed to employ hand railings made up of a number of detachable elements adapted to be removed from the car when it is to carry a load and then applied to the car after it has been unloaded. As is the case with all types of railway cars detachable fittings are unsatisfactory because in the course of time they are inevitably lost, misplaced or stolen.

Accordingly, one object of my invention is to provide a collapsible railing for a wellhole car which railing forms a permanent part of the car, and which is adapted when not in use to be housed beneath the car platform in a position not obstructing the load carrying space.

A further object of the invention is to provide in a car of the character described, a railing which is adapted to surround the well-hole on all sides, and of which all the joints, fittings and locking devices comprise permanent, non-detachable parts of the car.

Other objects and advantages characterizing my invention will become more fully apparent from the description hereinafter set forth of one embodiment or example of the practice of the invention, the description having reference to the accompanying drawings, whereof:

Fig. I represents a perspective view of a well-hole freight car equipped with a railing of my invention, with the railing shown in elevated position.

Fig. II represents a plan view of the same.

Fig. III represents a longitudinal cross section of the same, taken as indicated by the lines III—III of Fig. II.

Fig. IV represents a transverse cross-section of the same, taken as indicated by the lines IV—IV of Fig. III.

Fig. V represents an enlarged view of one of the side sections of the railing while in the act of being collapsed, the view being taken as indicated by the lines V—V of Fig. II.

Fig. VI represents an enlarged view of the side section of the railing after it has been collapsed, and prior to its being swung to housed position beneath the side sill of the car.

Fig. VII represents a cross section of a side sill of the car, taken as indicated by the lines VII—VII of Fig. V.

Fig. VIII represents a similar cross section of the lower portion of the side sill showing the clamping hook swung downward preparatory to receiving the folded railing sections beneath the bottom of the side sill.

Fig. IX represents a similar cross section of the lower portion of the side sill showing the clamping hook swung upward and locked with the railing sections accommodated thereon.

Fig. X represents a cross section, taken as indicated by the lines X—X of Fig. III and showing the railing sections housed within a clamping hook beneath the side sill.

Fig. XI represents in perspective the elements of a hinge joint between the side and end sections of the railing as used at two of the corners of the well-hole, showing the elements before assembly.

Fig. XII represents in perspective the same hinge joint after the elements have been assembled together, the location of the hinge joints being designated by the circles XII of Fig. II.

Fig. XIII represents in perspective the elements of a lock joint between the side and end sections of the railing as used at the other two corners of the well-hole, showing the elements before assembly.

Fig. XIV represents in perspective the same lock joint after the elements have been assembled together, the location of the lock joints being designated by the circles XIV of Fig. II.

Fig. XV represents an enlarged view, partly in cross section, of a portion of the lock joint of Fig. XIV, with the locking bolt in raised position.

Fig. XVI represents a cross sectional view of the same, taken as indicated by the lines of XVI—XVI of Fig. XV, with the locking bolt in lowered position.

Fig. XVII represents a perspective view of the locking bolt.

Fig. XVIII represents a perspective view of a bracket associated with the arms to which the intermediate upright posts are hinged.

Fig. XIX represents a cross section of the same, taken as indicated by the lines XIX—XIX of Fig. XVIII, and showing in broken lines the arm associated therewith.

Fig. XX represents a perspective view of the keeper attached to the bracket shown in Figs. XIX and XX.

Fig. XXI represents a perspective view of a bracket positioned beneath the side sills and associated with the clamping hooks which house the railing sections.

Fig. XXII represents a perspective view of the keeper attached to the bracket shown in Fig. XXI.

Fig. XXIII represents a cross section of the bottom end of one of the corner posts, taken as indicated by the lines XXIII—XXIII of Fig. III; and, Fig. XXIV represents a perspective view of one of the sliding rings used for securing together the side rails, end rails and corner posts when the same are folded upon each other.

With particular reference to Figs. I to IV of the drawings, there is shown a well-hole freight car embodying a hand railing of my invention. The car body is in general similar to that of an ordinary flat car, except that centrally between the sides and ends there is provided a large rectangular opening 1, constituting the well-hole. The car body thus comprises two longitudinal side sills 2 and unobstructed deck portions 3 at each end thereof. It will be understood that the brake pipes and other apparatus normally suspended from a freight car are housed within the side sills 2, which are preferably of rigid box-shaped formation and built up of channel bars 4 and top and bottom plates 5, 6.

Surrounding the well-hole 1 at the inner edges of the side sills 2 and deck portions 3, there is provided a hand railing comprising a series of tubular elements attached to the sills 2. The hand railing comprises a series of top rails 7a to 7f, inclusive, of tubular form and upright posts 8a, 8b, of similar form. Of the top rails, those disposed transversely of the car near the ends are designated at 7a, 7b; the side rails at one side are designated at 7c, 7d; and the side rails at the opposite side are designated at 7e, 7f. As hereinafter more fully described, the end rail 7a is pivoted to the side rail 7c, and is releasably attached to the side rail 7e; and in like manner the end rail 7b is pivotally connected to the side rail 7f and releasably attached to the side rail 7d. Of the upright posts, the four corner posts 8b are pivotally attached to the top rails at the corners of the well-hole and releasably locked to the top surface of the deck portions 3. The intermediate corner posts 8a are pivotally attached to the top rails 7c, 7d, 7e, 7f, at their upper ends, and at their lower ends are pivotally attached to hinged arms 9 disposed beneath the side sills 2. It will be especially observed that the hand railing thus comprises four independent sections, and that two of the sections include as elements thereof the end rails 7a, 7b.

The means by which the end rail 7b is pivotally attached to the side rail 7f are clearly illustrated in Figs. XI and XII. At the joint there is a corner piece 10 which is bifurcated at 11 to receive the flat end 12 of a terminal fitting 13 secured within the end of the end rail 7b, shown in broken lines. The corner piece 10 is also bifurcated at 14 to receive the flat end 15 of a terminal fitting at the top of the corner post 8b shown in broken lines. The corner piece 10 also includes as an integral part a cylindrical fitting 16 which is adapted to be secured within the end of the side rail 7f shown in broken lines. All of the fittings 13, 15, 16 are securely riveted within the ends of the tubular elements with which they are associated. For this purpose the fittings are in each case provided with circular openings 17. Moreover, rivets are provided at 18, 19 for establishing permanent pivotal connection between the corner piece 10, the end rail 7b and the corner post 8b. The end rail 7a is pivotally joined to the side rail 7c in the same manner as described above.

The releasable connection between the end rail 7b and the side rail 7d is shown in detail in Figs. XIII to XVII. In these figures the end rail 7b is indicated in broken lines, and the side rail 7d and corner post 8b are similarly illustrated. The corner piece is designated at 22 and is bifurcated at 23 to receive the flat end of a terminal fitting 24 riveted to the corner post 8b. The corner piece 22 is also bifurcated at 25 to receive the flat end of a terminal fitting 26 at the end of the end rail 7b. The corner piece 22 includes as an integral part a fitting in the form of a cylindrical plug 27 which is riveted within the side rail 7d. By means of a rivet 28, the corner piece 22 is permanently and pivotally joined to the corner post 8b. However, the connection between the corner piece 22 and the terminal fitting 26 of the end rail 7b is made releasable and is established by means of a slotted locking bolt 29. This locking bolt and its slot 30 are shown in detail in Fig. XVII. Its relatively broad head 31 limits its movement in a downward direction, whereas movement in an upward direction is limited by means of a pin 32 shown in Fig. XV. From the latter figure the manner in which the end rail 7b is released from the corner piece 22 will be apparent. The end rail 7a is releasably attached to the side rail 7e in the same manner and by similar connections to those described above.

The nature of the intermediate upright posts 8a is clearly illustrated in Figs. V and VI. These upright posts 8a are pivotally joined to the side rails 7c, 7d, 7e, 7f, by means of T-connections 33. They are normally held in rigid association within recesses 20 in the side sills 2 by means of sliding dowel pins 34 which engage within sockets 35 in the top surface of the side sills, but which can be readily disengaged by upward sliding movement along the posts 8a. The lower end of each post 8a is pivotally joined at 36 to the ends of the hinged arms 9 extending laterally beneath the side sills 2. Each corner post 8b has at the lower end thereof a barrel bolt 37 which releasably engages an opening 38 in the top surface of the deck portion 3 of the car. The barrel bolt 37 is shown in detail in Fig. XXIII. It is permanently confined within the lower end of the tubular corner post 8b by means of a pin 39 which has limited movement within a slot 40. The pin 39 also affords a convenient means by which the barrel bolt 37 may be raised when it is desired to collapse the railing.

As illustrated in Fig. V, the first step involved in collapsing the sections of the hand railing consists in folding the ends rails 7a, 7b upon the side rails 7c, 7f. The ends rails are released for swinging movement by raising the solid bolts 29, shown in Figs. XIII to XVII, inclusive. They are then swung in a horizontal plane through an angle of 90° to engagement with the side rails to which they are pivotally attached. The second step involved in collapsing the railing sections consists in releasing the corner posts 8b from their sockets 38. This is accomplished by raising the barrel bolts 37 by means of their pins 39. The third step consists in swinging the corner posts 8b upward in a vertical plane, each to a position corresponding to that shown at the right hand of Fig. V. The end rails 7a, 7b and the corner posts 8b are held temporarily in the positions to which they are swung by means of rings 41. Each ring 41 is in the form of a figure "8", as shown in Fig. XXIV. Two such rings are provided on the side rails 7c, 7f, whereas one such ring is provided on the side rails 7d, 7e. The fourth step, therefore, consists in temporarily securing the corner posts 8b and end rails 7a, 7b to their side rails by means of the rings 41.

The fifth step involved in collapsing the railing sections consists in withdrawal of certain keepers 49 which are hereinafter more specifically described. As most clearly shown in Fig. VII, the intermediate upright posts 8a are maintained in vertical position and rigid association with the side sills 8 not only by means of the sliding dowel pins 34, but also by means of brackets 44 located at spaced intervals along the underside of the side sills 2. The detailed construction of each bracket 44 is illustrated in Figs. XVIII, XIX and XX. Each bracket 44 has depending therefrom lugs 45, 46 slotted, respectively, at 47, 48. A keeper 49 in the form of a flat bar is adapted to slide within the slots 47, 48. The keeper 49, shown in perspective in Fig. XX, has thereon a pin 50 at one end and a circular boss 51 at the other end. The pin 50 may slide through the grooves 52 of the slot 48 in the depending lug 46, but cannot slide through the slot 47 of the depending lug 45, see Fig. XIX. Obviously, therefore, the keeper 49 cannot be removed from the car. To lock the keeper 49 in place, a sliding bolt 53 is employed, this bolt having capacity for vertical movement within the cylindrical opening 54 of the circular boss 51 of the keeper 49, but having heads at each end so that it cannot be removed. When the keeper 49 is in the locked position, the sliding bolt 53 is passed through an opening 55 within a lateral extension 56 of the lug 45. This position is represented in broken lines in Fig. XVIII. To release the keeper 49, the sliding bolt 53 is raised, the keeper is slid laterally to the position indicated in full lines, and the sliding bolt 53 is then allowed to drop. The keeper 49 maintains the hinged arm 9 at the lower end of each intermediate post 8a in a horizontal position. Hence for the purpose of collapsing the railing sections, it is necessary to withdraw the keepers 49.

The sixth step consists in raising the sliding dowel pins 34 out of engagement with their sockets 35. The seventh step involves swinging movement of each railing section downward and inward as indicated in Fig. VII. When each railing section is swung to position there indicated in broken lines, the railing sections are ready to be collapsed.

The eighth step consists in swinging the railing sections in a direction longitudinally of the car about the pivotal connections 33, 36, with a motion as represented in Fig. V. If it be assumed that the side rails 7c, 7e are at the forward end of the car, the railing sections involving these parts are swung toward the rear of the car, whereas the rear sections of the railing, involving the side rails 7d, 7f are swung toward the forward end of the car.

When the movement described above has been completed, each railing section assumes the position shown in Fig. VI. To complete the housing of the railing sections beneath the side sills 2 of the car, additional apparatus is suspended from the bottom plates 6 of the sills as follows. At spaced intervals along each side sill 2, there are clamping hooks 57 hinged to angle pieces 58 and each formed with a handle 59 and a laterally projecting flat end 60. The flat end 60 of the clamping hooks 57 are adapted to be accommodated within brackets 61 as shown in Fig. X. The structural details of each bracket 61 are illustrated in Figs. XXI and XXII. Each bracket 61 has depending therefrom spaced parallel lugs 62 having circular openings 63 therein. A cylindrical keeper 64, shown in perspective in Fig. XXII, is adapted for sliding movement within the openings 63. The keeper 64 is attached by means of a chain 65 to the car and forms a permanent part thereof. For the purpose of maintaining the keeper 64 in place, it has a bifurcated end 66 to which is hinged a finger 67. In an obvious manner, by turning the finger 67 through an angle of 90°, the keeper 64 may be maintained against dislodgment incident to vibration of the car.

The ninth step in the collapsing of the railing sections consists in the swinging of the sections downward and outward about the hinges 68 to which the arms 9 are connected, as indicated in Figs. VII, VIII and IX. The railing sections, with the elements thereof folded upon each other and collapsed, are swung from the position shown in Fig. VIII to the position shown in Fig. IX.

Thereupon the tenth step comprises the upward swinging of the clamping hooks 57 from the position shown in Fig. VIII to the position shown in Fig. IX, and the eleventh step comprises the locking of the clamping hooks 57 in place by movement of the keepers 64.

The steps involved in returning the railing sections from housed position beneath the side sills of the car to elevated positions surrounding the well-hole are the reverse of the steps enumerated above, and will be apparent from the description of the constituent elements of the railing sections.

It is to be especially noted that the hand railing of this invention comprises tubular elements and locking attachments all of which form a permanent part of the car equipment, and which cannot be detached or withdrawn except with great difficulty. Moreover, it is to be noted that the operations involved in folding and collapsing the elements of the hand railings, and swinging these elements to a housed position beneath the car, are of a simple nature which can be performed by a single man; and that when the hand railing sections are thus housed, they do not obstruct the platform space or the lading space within the well-hole in any manner.

While I have described the specific details of construction of one embodiment of a hand railing of my invention, it will be readily apparent that various changes may be made in the mechanical details, such as the devices used for locking and releasably attaching the swinging elements, and that many other changes may be made in the form and disposition of the parts of the railing sections, without departing from the spirit of my invention as defined in the annexed claims.

Having thus described my invention, I claim:—

1. In a well-hole freight car, a railing at the well-hole comprising collapsible sections adapted to be swung downward through the well-hole to housed position beneath the car.

2. In a well-hole freight car, a railing completely surrounding the well-hole and comprising a plurality of collapsible sections adapted to be swung downward through the well-hole to housed position beneath the car.

3. In a well-hole freight car, side sills defining with the ends of the car a substantially rectangular well-hole, and a railing including sections at the inner edge of each side sill, said railing sections being collapsible and adapted to be swung downward through the well-hole and outward to housed position beneath the side sills.

4. In a well-hole freight car, a railing completely surrounding the well-hole and comprising a plurality of sections forming a permanent part of the car, said sections being adapted to be individually collapsed and moved to a housed position beneath the car.

5. In a well-hole freight car, side sills defining with the ends of the car a substantially rectangular well-hole, a railing completely surrounding the well-hole and comprising side and end sections permanently attached to the car, said side and end sections being foldable upon each other and movable to a housed position beneath the side sills.

6. In a well-hole freight car, a railing at the well-hole comprising a plurality of sections, said sections including side and end rails and upright posts, the elements of each said section being foldable upon themselves, and said sections being pivoted at the well-hole and adapted to be swung to housed position beneath the car.

7. In a well-hole freight car, side sills defining with the ends of the car a substantially rectangular well-hole, and a railing completely surrounding said well-hole, said railing comprising posts pivoted to the bottom of the side sills at the well-hole, side rails pivoted to said posts and end rails pivoted to said side rails.

8. In a well-hole freight car, side sills defining with the ends of the car a substantially rectangular well-hole, and a railing completely surrounding said well-hole, said railing comprising posts pivoted to the bottom of the side sills at the well-hole and adapted for movement in directions longitudinally of and transversely to the car, side rails pivoted to said posts, and end rails pivoted to said side rails.

9. In a well-hole freight car, side sills defining with the ends of the car a substantially rectangular well-hole, and a railing completely surrounding said well-hole, said railing comprising posts intermediate the car ends pivoted to the bottom of the side sills at the well-hole and adapted for movement in directions longitudinally of and transversely to the car, side rails pivoted to said intermediate posts, end posts pivoted to said side rails, and end rails pivoted to said side rails.

10. In a well-hole freight car, a railing at the well-hole comprising forward and rear sections mounted at each side of the well-hole, the forward sections of said railing being collapsible by folding the elements thereof upon themselves with a swinging movement of such elements toward the rear of the car, and the rear sections of said railing being collapsible by folding the elements thereof upon themselves with a swinging movement of such elements toward the forward end of the car, all of said sections being swingable downward through the well-hole to housed position beneath the car.

11. In a well-hole freight car, a side sill at each side of the well-hole, and a railing including forward and rear sections pivoted at the bottom inner edge of each side sill, the forward sections of said railing being collapsible by folding the elements thereof upon themselves with a swinging movement of such elements toward the rear of the car, and the rear sections of said railing being collapsible by folding the elements thereof upon themselves with a swinging movement of such elements toward the forward end of the car, and all of said sections being swingable downward through the well-hole and outward to housed position beneath the side sills.

12. In a well-hole freight car, a railing at the well-hole and hooks beneath the sides of the car, said railing comprising collapsible sections adapted to be swung downward through the well-hole and outward beneath the sides of the car to engagement with said hooks.

13. In a well-hole freight car, a side sill at each side of the well-hole, hooks pivoted to the underside of the side sills, and a railing surrounding the well-hole, said railing comprising side and end rails adapted to be folded upon each other and swung downward through the well-hole and outward beneath the side sills to engagement with said hooks.

14. In a well-hole freight car, a railing at the well-hole comprising posts pivoted to the car, side rails pivoted to the upper ends of said posts, and means slidable on said posts for locking the same in upright position, said posts and side rails being foldable upon each other and movable to housed position beneath the car.

15. In a well-hole freight car, a collapsible railing at the well-hole comprising posts intermediate the ends of the car and pivoted thereto, side rails pivoted to the upper ends of said posts, end rails pivoted to said side rails, end posts pivoted to the side rails, means for locking the intermediate posts in upright position, means for locking the end posts in upright position, and means for locking the end rails to the end posts, all of said railing elements and locking means comprising permanent attachments of the car.

In testimony whereof I have hereunto signed my name at Pittsburgh, Pennsylvania, this 29th day of December, 1932.

WILLIAM B. MOIR.